United States Patent
Graf et al.

(10) Patent No.: US 11,456,537 B1
(45) Date of Patent: Sep. 27, 2022

(54) VERTICAL LIFT AIRCRAFT PANELS WITH EMBEDDED SPIRAL ANTENNAS

(71) Applicant: Rockwell Collins, Inc., Cedar Rapids, IA (US)

(72) Inventors: Joseph T. Graf, Center Point, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/159,781

(22) Filed: Jan. 27, 2021

(51) Int. Cl.
*H01Q 9/27* (2006.01)
*H01Q 1/28* (2006.01)
*H01Q 21/06* (2006.01)
*G01S 13/90* (2006.01)
*B64C 1/36* (2006.01)

(52) U.S. Cl.
CPC .............. *H01Q 9/27* (2013.01); *H01Q 1/286* (2013.01); *H01Q 1/287* (2013.01); *H01Q 21/061* (2013.01); *B64C 1/36* (2013.01); *G01S 13/9023* (2013.01)

(58) Field of Classification Search
CPC ............ H01Q 9/27; H01Q 1/28; H01Q 1/286; H01Q 1/287; H01Q 21/061
See application file for complete search history.

(56) References Cited

U.S. PATENT DOCUMENTS

| | | |
|---|---|---|
| 2,589,664 A | 3/1952 | Bowman |
| 2,612,606 A | 9/1952 | Stephen |
| 2,685,029 A | 7/1954 | Lindenblad |
| 2,700,104 A | 1/1955 | Bowman |
| 2,701,307 A | 2/1955 | John |
| 3,823,403 A | 7/1974 | Walter et al. |
| 4,510,500 A | 4/1985 | Brune |
| 5,032,844 A | 7/1991 | Hipp et al. |
| 5,166,697 A | 11/1992 | Viladevall et al. |
| 5,315,309 A | 5/1994 | Rudow et al. |
| 5,646,633 A | 7/1997 | Dahlberg |
| 6,061,022 A | 5/2000 | Menegozzi et al. |
| 6,097,343 A | 8/2000 | Goetz et al. |
| 6,300,918 B1 * | 10/2001 | Riddle .................... H01Q 9/27 343/895 |

(Continued)

FOREIGN PATENT DOCUMENTS

| | | |
|---|---|---|
| AU | 2016219618 A1 | 9/2016 |
| EP | 0683399 A1 | 11/1995 |

(Continued)

OTHER PUBLICATIONS

U.S. Appl. No. 17/009,514, filed Sep. 1, 2020, entitled Embedded Antennas in Aerostructures and Electrically Short Conformal Antennas.

(Continued)

*Primary Examiner* — Hoang V Nguyen
(74) *Attorney, Agent, or Firm* — Suiter Swantz pc llo

(57) ABSTRACT

A system of spiral antennas is incorporated into aircraft body panels. The spiral antennas may be slot or printed material antennas, cavity backed for unidirectional communication, or open for bi-directional communication. The spiral antennas are operated in concert as a steerable array. The spiral antennas are utilized for various signal functions including ultra-wideband communications and electronic support measures interferometry.

20 Claims, 7 Drawing Sheets

(56) References Cited

U.S. PATENT DOCUMENTS

| | | |
|---|---|---|
| 7,109,942 B2 | 9/2006 | McCarville et al. |
| 7,274,338 B2 | 9/2007 | Ozkar et al. |
| 8,791,868 B2 | 7/2014 | McCarthy et al. |
| 9,716,322 B2 | 7/2017 | Holzheimer |
| 9,893,414 B2 | 2/2018 | Gil et al. |
| 10,141,656 B2 | 11/2018 | Urcia et al. |
| 10,290,931 B1 | 5/2019 | Judd |
| 10,468,771 B2 | 11/2019 | Mentesana et al. |
| 10,581,146 B2 | 3/2020 | Lavin et al. |
| 10,644,384 B1 | 5/2020 | Ozdemir et al. |
| 10,644,385 B1 | 5/2020 | Greenwood et al. |
| 2003/0227422 A1 | 12/2003 | Berry et al. |
| 2005/0007294 A1 | 1/2005 | Handelsman |
| 2006/0290581 A1 | 12/2006 | Parsche |
| 2008/0169988 A1 | 7/2008 | Deaett et al. |
| 2010/0283693 A1 | 11/2010 | Xie et al. |
| 2018/0166781 A1 | 6/2018 | Snyder et al. |
| 2019/0341679 A1 | 11/2019 | Ozdemir et al. |
| 2020/0185830 A1 | 6/2020 | West |

FOREIGN PATENT DOCUMENTS

| | | |
|---|---|---|
| GB | 654707 A | 6/1951 |
| GB | 766087 A | 1/1957 |
| GB | 1270219 A | 4/1972 |
| GB | 2474775 B | 10/2013 |
| WO | 1994021003 A1 | 9/1994 |

OTHER PUBLICATIONS

Extended Search Report in European Application No. 22150322.0 dated May 23, 2022, 10 pages.

* cited by examiner

US 11,456,537 B1

VERTICAL LIFT AIRCRAFT PANELS WITH EMBEDDED SPIRAL ANTENNAS

BACKGROUND

In many vertical lift aircraft applications, such as military attach helicopters, there is a critical need to eliminate drag and antenna count in the limited real estate available, and also augment communication capabilities. Some HF antennas may be incorporated into or closely integrated with the body panels of such platforms, but that incorporation consumes substantial surface area, leaving limited surface area to incorporate other, higher frequency antennas. Various on-board systems require dedicated antenna structures that may add substantial drag and complexity, and in some also require directionality.

SUMMARY

In one aspect, embodiments of the inventive concepts disclosed herein are directed to a system of spiral antennas incorporated into aircraft body panels. The spiral antennas may be slot or printed material antennas, or cavity backed for unidirectional communication.

In a further aspect, the spiral antennas are operated in concert as a steerable array.

In at least one embodiment, the spiral antennas are utilized for various signal functions including communications.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1B:
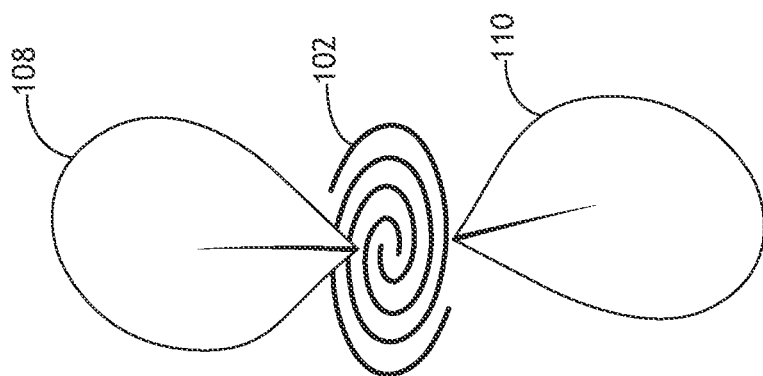
FIG. 1B shows a spiral antenna element according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system of antennas, each having disparity operating frequencies, incorporated into the same aircraft body panels. HF antennas define loops with large internal areas; additional higher frequency antennas are disposed within that large internal area. Antennas operating in the same frequency range, disposed on different parallel surfaces are operated in concert as a steerable array.

Figure 1A:
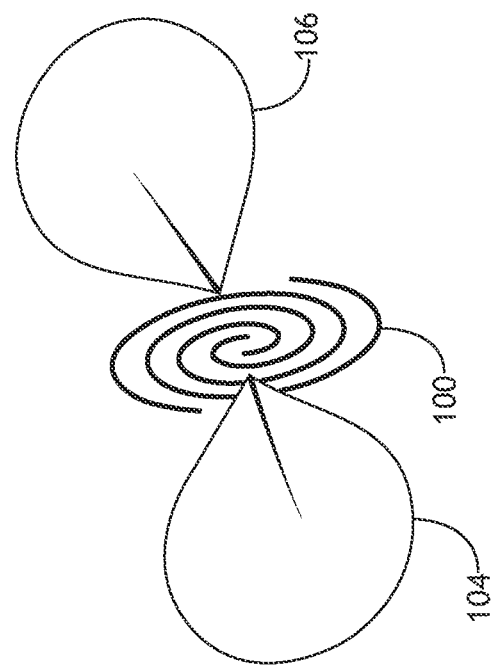
FIG. 1A shows a spiral antenna element according to an exemplary embodiment.

Referring to FIGS. 1A-1B, spiral antenna elements 100, 102 according to an exemplary embodiment are shown. In at least one embodiment, each spiral antenna element 100, 102 may be integrated into an aircraft body panel, and the spiral cavity may be backless (e.g., without ground plane) for bi-directional radiation with circular polarization. Spiral antenna elements 100, 102 may be extremely broadband as frequency is not limited by cavity backing that is otherwise required for unidirectional radiation. In some embodiments, spiral antenna elements 100, 102 are useful for interferometry and for ultra-wideband communications.

Spiral antenna elements 100, 102 may be disposed to produce horizontal cardioid end fire patters 104, 106 or disposed to produce vertical cardioid patters 108, 110. Horizontal cardioid end fire patters 104, 106 enable yaw plane or azimuth plane interferometry. Likewise, vertical cardioid end fire patters 108, 110 enable pitch plane or azimuth plane interferometry.

Directional spiral antenna elements 100, 102 enable air-to-ground and air-to-air direction finding/electronic support measures.

Figure 2B:
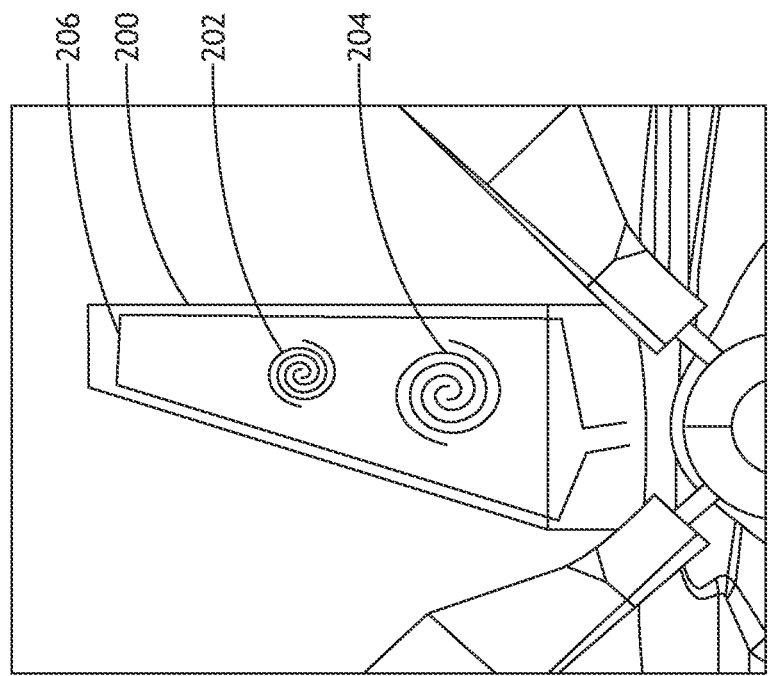
FIG. 2B shows a top view of an aircraft panel according to an exemplary embodiment.
Figure 2A:
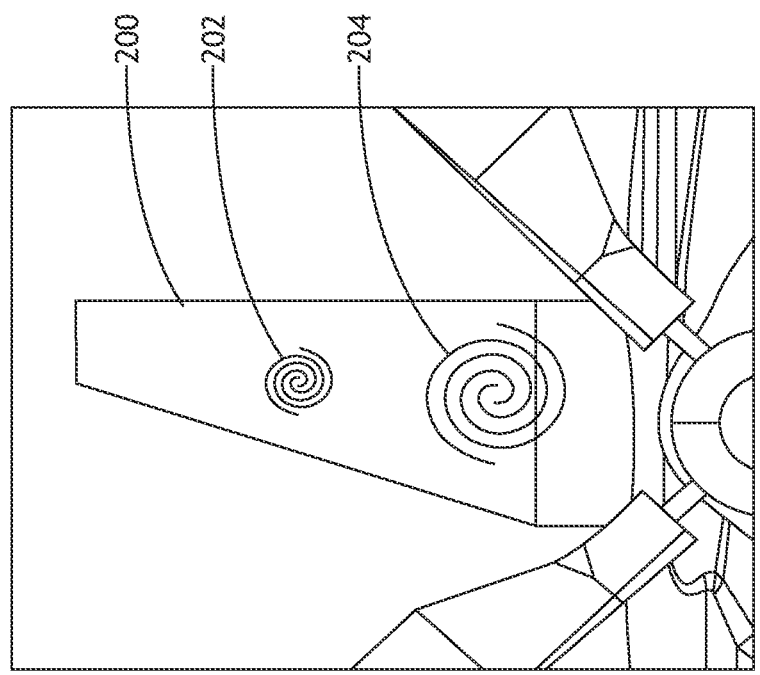
FIG. 2A shows a top view of an aircraft panel according to an exemplary embodiment.

Referring to FIGS. 2A-2B, top views of aircraft panels 200 according to an exemplary embodiment are shown. Spiral antenna elements 202, 204 are disposed in an aircraft panel 200 for interferometry and communication. The spiral antenna elements 202, 204 may be configured for different frequency ranges via differently sized spirals; in at least one embodiment, at least one spiral antenna element 202, 204 is configured to operate in a frequency range centered on about 18 GHz. In at least one embodiment, the spiral antenna elements 202, 204 may be disposed inside an area defined by a high-frequency antenna element 206 also disposed in the aircraft panel 200.

Figure 3:
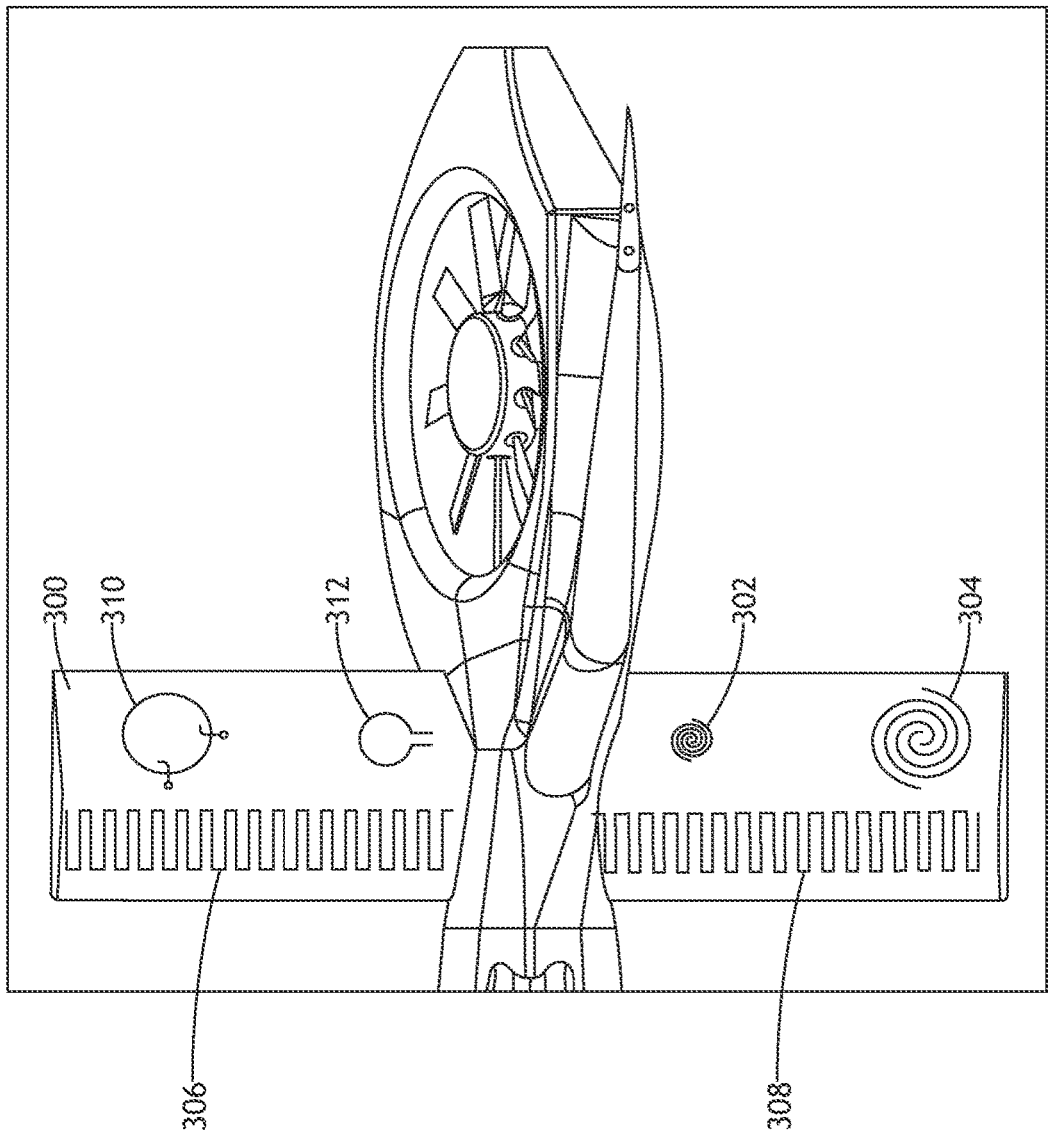
FIG. 3 shows a top view of aircraft panels according to an exemplary embodiment.

Referring to FIG. 3, a top view of aircraft panels 300 according to an exemplary embodiment is shown. Spiral antenna elements 302, 304 are disposed in the aircraft panels 300 for interferometry and communication. In at least one embodiment, the spiral antenna elements 302, 304 are disposed alongside alternative antenna elements 306, 308, 310, 312 configured for applications that may not be achievable by the spiral antenna elements 302, 304, or that have to operate at the same time and in a non-interfering frequency range. The spiral antenna elements 302, 304 may be separated from the alternative antenna elements 306, 308, 310, 312 according their operating frequency ranges to minimize mutual coupling or interference.

In at least one embodiment, the alternative antenna elements 306, 308, 310, 312 may comprise ultra-high frequency annular slot antennas 310 configured for vertical polarization; ultra-high frequency loop antennas 312 configured for horizontal polarization; and/or meandering dipole antennas 306, 308.

Figure 4:
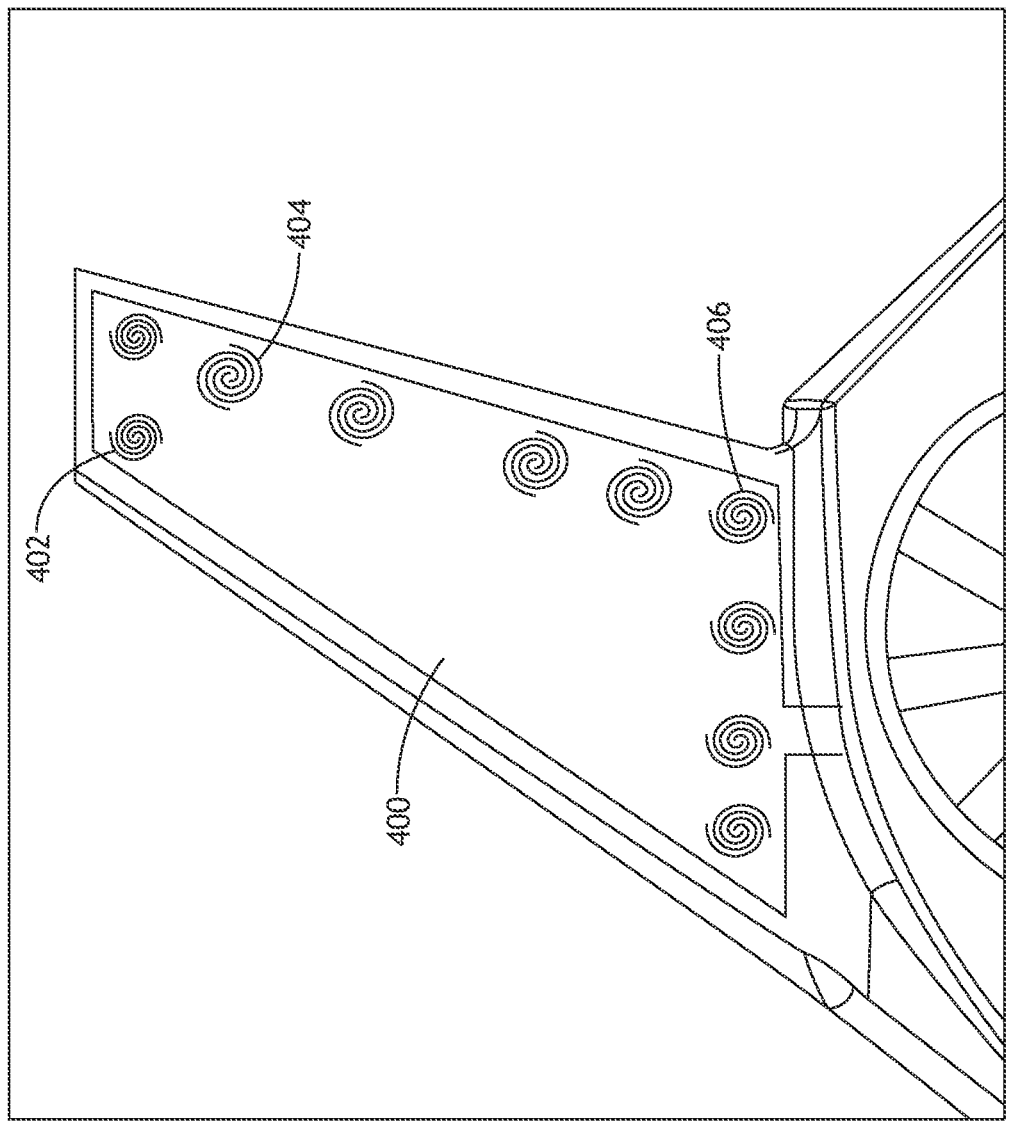
FIG. 4 shows a side view of an aircraft panel according to an exemplary embodiment.

Referring to FIG. 4, a side view of an aircraft panel 400 according to an exemplary embodiment is shown. The aircraft panel 400, such as a vertical stabilizer, includes a plurality of spiral antenna elements 402, 404, 406. Spiral antenna elements 402, 404, 406 disposed in a vertical stabilizer are oriented to produce horizontal directed signals. In at least one embodiment, spiral antenna elements 402 may be disposed along a top edge of the aircraft panel 400 and configured for horizon-to-horizon interferometry. Likewise, spiral antenna elements 406 may be disposed along a bottom edge of the aircraft panel 400 and configured for horizon-to-horizon interferometry. Alternatively, or in addition, spiral antenna elements 404 may be disposed along a trailing edge of the aircraft panel 400 and configured for diagonal plane interferometry. Furthermore, staggering spiral antenna elements 404, especially along the training edge, may realize pure vertical interferometry.

Figure 5:
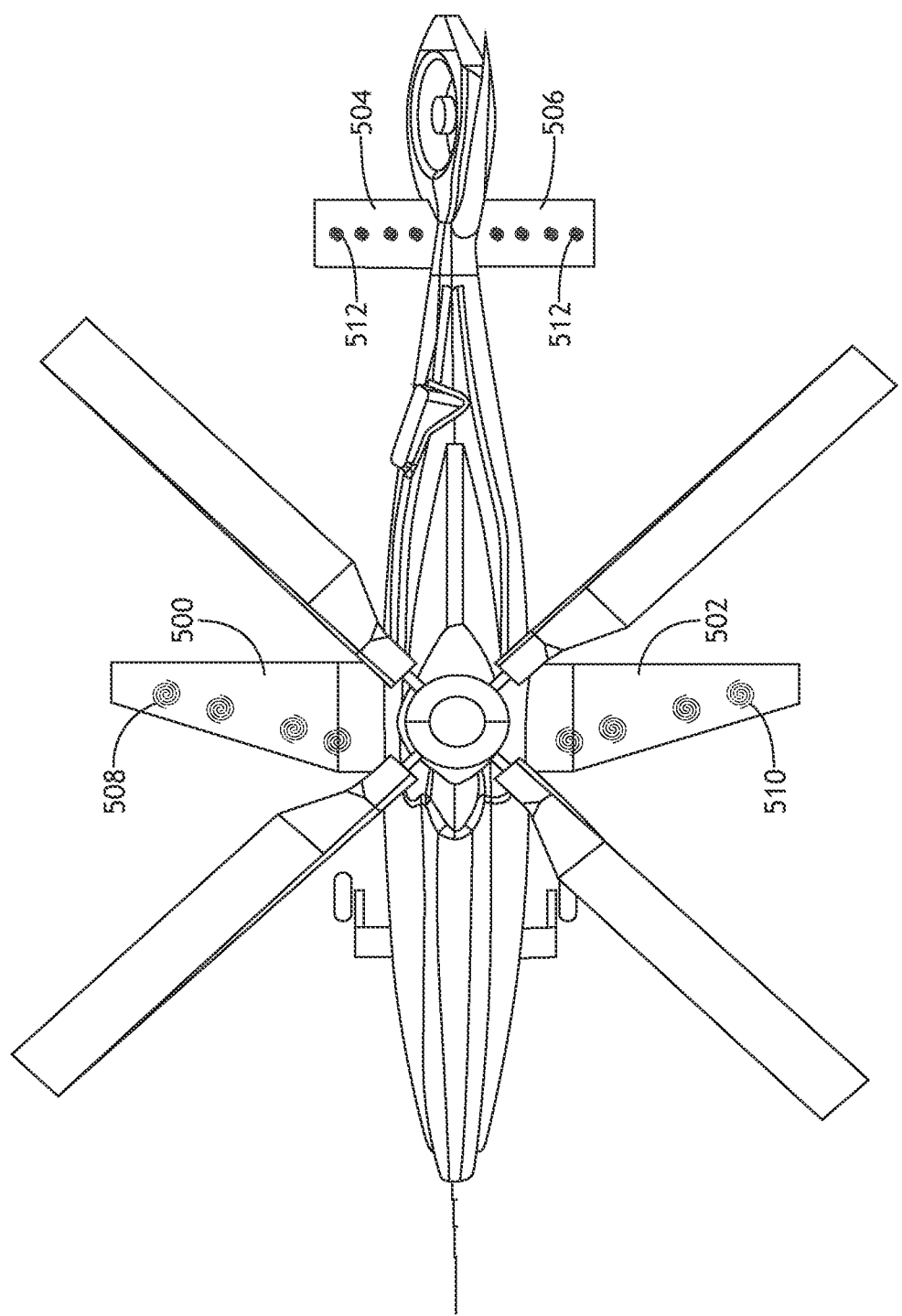
FIG. 5 shows a top view of an aircraft according to an exemplary embodiment.

Referring to FIG. 5, a top view of an aircraft according to an exemplary embodiment is shown. Spiral antenna elements 508, 510, 512 may be utilized in electronic support measures interferometry. Up/down interferometry may be realized via spiral antenna elements 508, 510, 512 disposed on horizontal surfaces 500, 502, 504, 506. Such spiral antenna elements 508, 510, 512 may be operated as an array, either specific to a corresponding horizontal surface 500, 502, 504, 506 or across multiple horizontal surfaces 500, 502, 504, 506.

Interferometric arrays that utilized spiral antenna elements 508, 510, 512 (i.e., 3 different arrays) may be spaced according to an intended operating frequency range; for example, spiral antenna elements 508, 510, 512 may be spaced five wavelengths, nine wavelengths, and 6.6 wavelengths from neighboring spiral antenna elements 508, 510, 512; in another exemplary embodiment, two elements may have half wavelength spacing.

Figure 6:
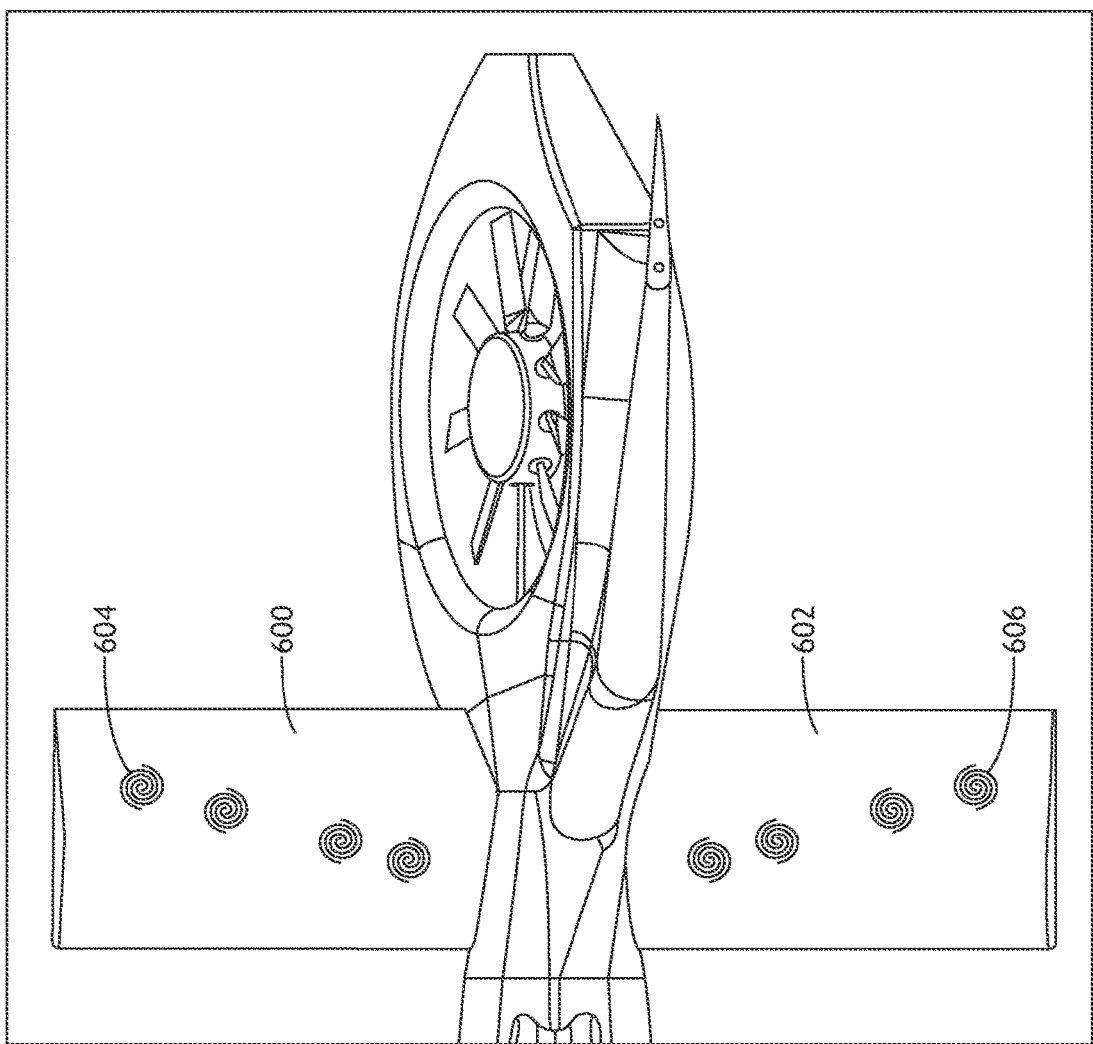
FIG. 6 shows a top view of aircraft panels according to an exemplary embodiment.

Referring to FIG. 6, a top view of aircraft panels 600, 602 according to an exemplary embodiment is shown. The aircraft panels 600, 602 include spiral antenna elements 604, 606 that may be configured for bi-directional interferometry or communications. In at least one embedment, the spiral antenna elements 604, 606 may be spaced from each other according to application and operating frequency; furthermore, the spiral antenna elements 604, 606 may be staggered.

Figure 7:
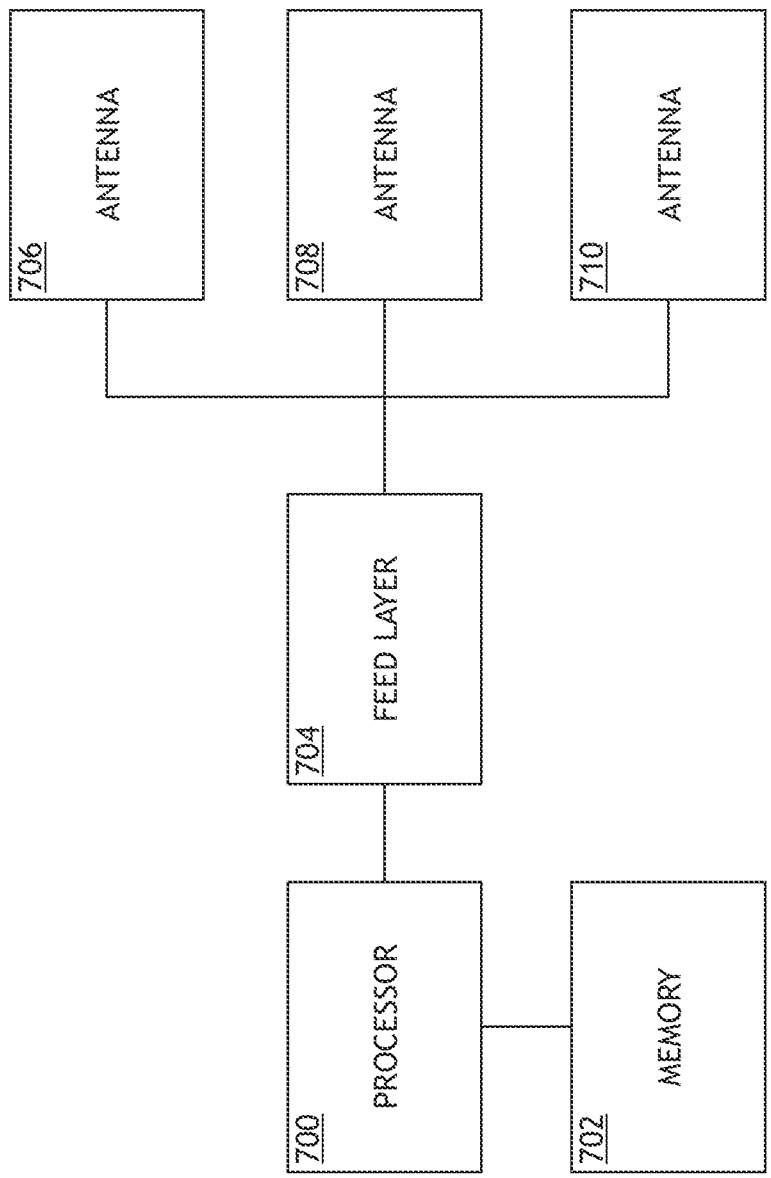
FIG. 7 shows a block diagram of a system according to an exemplary embodiment.

Referring to FIG. 7, a block diagram of a system according to an exemplary embodiment is shown. The system includes at least one processor 700 in data communication with a memory 702 for storing non-transitory processor executable code. The processor 700 applies signals to a radiating element feed network 704 that further applies signals to a plurality of spiral antenna elements 706, 708, 710. The signals configure the spiral antenna elements 706, 708, 710 for various signal applications including interferometry and communications. In at least one embodiment, the signals configure the spiral antenna elements 706, 708, 710 via phase shift to produce radiation patterns for beam directionality. In at least one embodiment, spiral antenna elements 706, 708, 710 may be disposed in separate body panels of an aircraft and operated as an array across those panels.

In at least one embodiment, a first set of spiral antenna elements 706 are disposed on a horizontal surface of an aircraft and a second set of spiral antenna elements 708 are disposed on a vertical surface of the aircraft. The first set of spiral antenna elements 706 are configured for air-to-ground interferometry while the second set of spiral antenna elements 708 are configured for air-to-air, air-to-ground, and ground-to-ground interferometry, as CONOPS dictate. Furthermore, a third set of spiral antenna elements 710, disposed on horizontal surfaces, vertical surfaces, or both, are configured for communications.

While specific embodiment described herein are directed toward communication and direction-finding Interferometry, it may be appreciated that embodiments are also useful for UHF foliage penetration radar (FOPEN).

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft antenna system comprising:
a plurality of spiral antenna elements;
a feed network configured to drive each of the plurality of spiral antenna elements; and
at least one processor connected to the feed network and a memory storing processor executable code,
wherein:
the plurality of spiral antenna elements are configured for interferometry and communications; and
the processor executable code configures the at least one processor to determine signals to apply to the feed network to configured the plurality of spiral antenna elements as an array.

2. The aircraft antenna system of claim 1, wherein each of the plurality of spiral antenna elements are cavity backless.

3. The aircraft antenna system of claim 1, wherein a first set of spiral antenna elements in the plurality of spiral antenna elements and a second set of spiral antenna elements in the plurality of spiral antenna elements are disposed orthogonally.

4. The aircraft antenna system of claim 1, wherein the at least one processor is further configured to:
apply signals to the feed network to operate a first set of spiral antenna elements in the plurality of spiral antenna elements for communication; and
simultaneously apply signals to the feed network to operate a second set of spiral antenna elements in the plurality of spiral antenna elements for interferometry.

5. The aircraft antenna system of claim 1, wherein the at least one processor is further configured to apply signals to the feed network to configure the spiral antenna elements for horizon-to-horizon interferometry.

6. The aircraft antenna system of claim 1, wherein the at least one processor is further configured to apply signals to the feed network to configure the spiral antenna elements for ultra-high frequency (UHF) foliage penetration radar (FOPEN).

7. An antenna system comprising:
a plurality of spiral antenna elements;
a feed network configured to drive each of the plurality of spiral antenna elements; and
at least one processor connected to the feed network and a memory storing processor executable code,
wherein:
the plurality of spiral antenna elements are configured for interferometry and communications; and
the processor executable code configures the at least one processor to determine signals to apply to the feed network to configured the plurality of spiral antenna elements as an array.

8. The antenna system of claim 7, wherein each of the plurality of spiral antenna elements are cavity backless.

9. The antenna system of claim 7, wherein a first set of spiral antenna elements in the plurality of spiral antenna elements and a second set of spiral antenna elements in the plurality of spiral antenna elements are disposed orthogonally.

10. The antenna system of claim 7, wherein the at least one processor is further configured to:
apply signals to the feed network to operate a first set of spiral antenna elements in the plurality of spiral antenna elements for communication; and
simultaneously apply signals to the feed network to operate a second set of spiral antenna elements in the plurality of spiral antenna elements for interferometry.

11. The antenna system of claim 7, wherein the at least one processor is further configured to apply signals to the feed network to configure the spiral antenna elements for horizon-to-horizon interferometry.

12. The antenna system of claim 7, wherein the at least one processor is further configured to apply signals to the feed network to configure the spiral antenna elements for diagonal plane interferometry.

13. An aircraft comprising:
a plurality of body panels, each comprising:
a plurality of spiral antenna elements defined by the body panel; and
a feed network configured to drive each of the plurality of spiral antenna elements in the body panel; and
at least one processor connected to the feed networks and a memory storing processor executable code,
wherein:
each of the plurality of spiral antenna elements are configured for interferometry and communications; and
the processor executable code configures the at least one processor to determine signals to apply to the feed networks to configured the corresponding plurality of spiral antenna elements as an array.

14. The aircraft of claim 13, wherein each of the at least one processor is further configured to determine signals to apply to the feed networks to configured the plurality of spiral antenna elements in all of the body panels as an array.

15. The aircraft of claim 13, wherein each spiral antenna element is cavity backless.

16. The aircraft of claim 13, wherein a first body panel in the plurality of body panels is disposed vertically and a second body panel in the plurality of body panels is disposed horizontally.

17. The aircraft of claim 16, wherein the spiral antenna elements in the first body panel are disposed along a top edge, and are configured for horizon-to-horizon interferometry.

18. The aircraft of claim 16, wherein the spiral antenna elements in the first body panel are disposed along a bottom edge, and are configured for horizon-to-horizon interferometry.

19. The aircraft of claim 16, wherein the spiral antenna elements in the first body panel are disposed along a trailing edge, and are configured for diagonal plane interferometry.

20. The aircraft of claim 13, wherein the at least one processor is further configured to:
apply signals to the feed networks to operate a first set of spiral antenna elements for communication; and
simultaneously apply signals to the feed network to operate a second set of spiral antenna elements for interferometry.

* * * * *